United States Patent [19]
Durfee, Jr.

[11] Patent Number: 5,133,135
[45] Date of Patent: Jul. 28, 1992

[54] ANGLE GAUGE

[75] Inventor: David L. Durfee, Jr., Meadville, Pa.

[73] Assignee: Susan M. Durfee, Meadville, Pa.

[21] Appl. No.: 635,879

[22] Filed: Dec. 28, 1990

[51] Int. Cl.⁵ .................................................. G01B 5/24
[52] U.S. Cl. ......................................... 33/534; 33/535; 33/427; 33/464
[58] Field of Search ............................. 33/533–535, 33/427, 464, 474, 480, 481, 501.1, 501.2

[56] References Cited

U.S. PATENT DOCUMENTS

| | | |
|---|---|---|
| 1,073,089 | 9/1913 | Bowers . |
| 1,852,760 | 4/1932 | Sisson . |
| 1,965,131 | 7/1934 | Simpson . |
| 2,397,280 | 3/1946 | Leszak . |
| 2,448,440 | 8/1948 | King . |
| 2,527,173 | 10/1950 | Boat . |
| 3,273,252 | 9/1966 | Bunge . |
| 3,380,165 | 4/1968 | Urban . |
| 3,387,374 | 6/1968 | Gordon . |
| 3,570,132 | 3/1971 | Guzzo . |
| 3,668,412 | 9/1972 | Keener . |
| 3,716,920 | 2/1973 | Worther ............................ 33/534 |
| 4,096,634 | 6/1978 | Gudel . |
| 4,112,581 | 9/1978 | Hornsby ............................ 33/534 |
| 4,375,724 | 3/1983 | Brock . |
| 4,680,869 | 7/1987 | Murkens . |
| 4,718,172 | 1/1988 | Rouse et al. . |

FOREIGN PATENT DOCUMENTS

| | | | |
|---|---|---|---|
| 0214919 | 10/1984 | Fed. Rep. of Germany ........ 33/533 |
| 0201101 | 8/1989 | Japan ..................................... 33/535 |

Primary Examiner—William A. Cuchlinski, Jr.
Assistant Examiner—Alvin Wirthlin
Attorney, Agent, or Firm—Oliff & Berridge

[57] ABSTRACT

This invention relates to a gauge device which may be used by a toolmaker or machinist to determine the squareness of surfaces on a workpiece. The device has a handle having a gauge mounted adjacent an end of the arm opposite the handle and an intermediate contact point such that the inner surface of the handle and the intermediate contact point define the planes of the surfaces of the workpiece to be measured. The device is easily used, easily transported, and capable of use with work-pieces having chamfered or otherwise altered corners, holes, slots or other imperfections that make determination of squareness difficult.

13 Claims, 2 Drawing Sheets

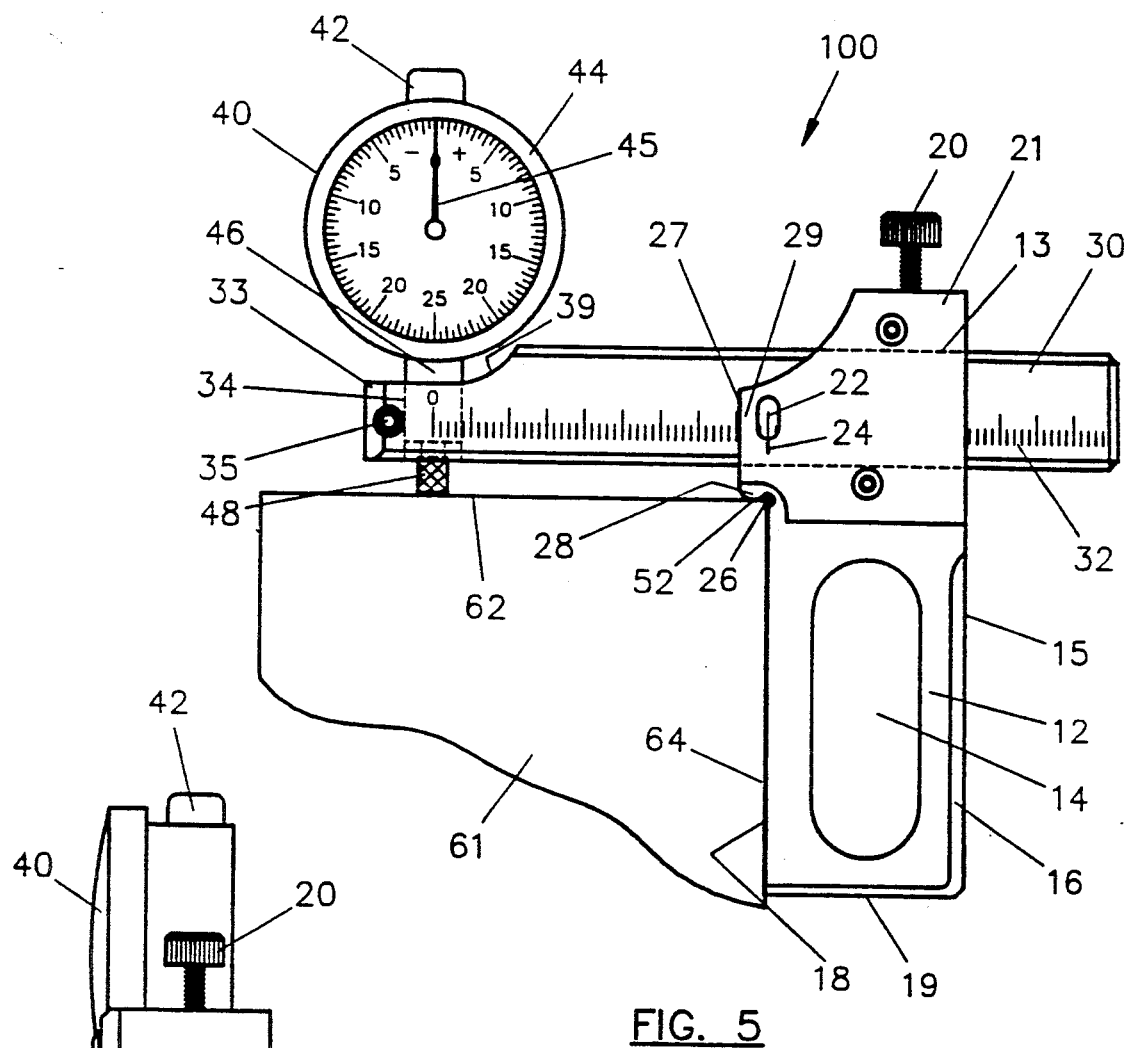
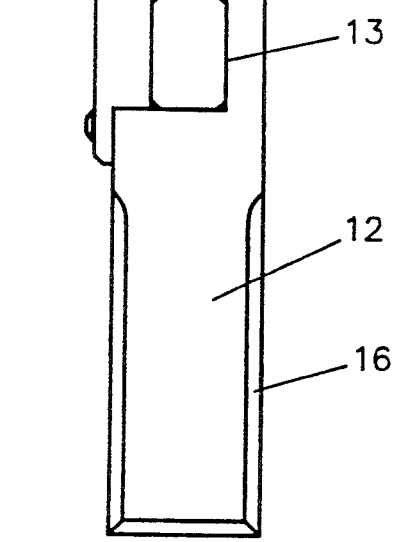
FIG. 5
FIG. 6

ANGLE GAUGE

BACKGROUND OF THE INVENTION

1. Field of the Invention

This invention relates to tools of the type used by toolmakers, diemakers and others to determine the deviation from a predetermined angle of a manufactured part.

2. Description of Related Art

The precision required for many machine parts is extremely critical. The precision may be required for either an inside angle or an outside angle. Although there are known devices for measuring either an inside or an outside angle, such as that disclosed in U.S. Pat. No. 3,380,165, most are intended for one use or the other. Even devices such as that disclosed in U.S. Pat. No. 3,380,165 generally are most effective in measuring either an inside angle or an outside angle.

A related class of gauges are those intended to measure deviation from proper alignment of cylinders such as U.S. Pat. No. 1,852,760. In application, these devices combine the features of measuring both inside and outside angles although they measure what is substantially an inside angle. Also related to the class of angle gauges and capable of providing an indication of deviation from specified angles are devices such as the mechanic's square of U.S. Pat. No. 2,448,440, draftsman's squares, and carpenter's squares. The reliability of these devices however is a function of the precision with which they are manufactured, the care that has been taken with them over their period of use, and integral angles to which they are manufactured such as right angles and 45° angles. However, devices of this type by themselves, only indicate deviation. They are unable to provide a measure of that deviation from the desired angle.

Cylinder or cylinder type gauges have provided one solution to the need for deviation measurement devices. These gauges are used to measure an inside angle, that is the angle between a horizontal surface and an essentially vertical surface. However, they can be used for measuring what is a workpiece outside angle by placing one surface face of the workpiece angle on a horizontal surface and using the cylinder type square to measure the deviation of the substantially vertical surface defined by the second face of the angle. Cylinder type gauges include a base leg that is placed on the horizontal surface and a vertical leg, normally cylindrical, that is placed against the vertical surface to be measured. The gauge may be mounted in or on either the base or vertical leg but is most normally found on the vertical leg. U.S. Pat. Nos. 3,273,252; 3,570,132; 3,688,412; and 4,096,634 disclose squareness gauges of this general type.

Related to this method of measurement is the indicating square of Leszak, U.S. Pat. No. 2,397,280, which is a cross between a carpenter's square with one edge adjustable and the operation principles of a cylinder square. In Leszak, the adjustable edge is in contact with a dial or gauge for measuring deviation.

An inherent disadvantage of these known cylinder gauges is that they require a smooth horizontal surface on which the workpiece must be placed for their use. Further, that surface must be of sufficient size to provide a stable footing for the horizontal leg or arm of the square in addition to the workpiece.

SUMMARY OF THE INVENTION

It is an object of the instant invention to provide an easy to understand and useful apparatus for checking the squareness of workpieces to a great degree of accuracy.

It is another object of the invention to provide an apparatus that is adjustable so that it may be used with workpieces of variable sizes.

It is a further object of the invention to provide an apparatus that may be used quickly without the necessity of moving the workpiece to a satisfactory surface or requiring a extended period of time for setting up and adjusting the apparatus.

A further object of the invention is to provide an apparatus capable of measuring the squareness of outside corners wherein the corner is chamfered or otherwise shaped and/or one or both surfaces have surface perturbations such as holes, slots and/or grooves.

To achieve the above and other objects clear to one skilled in the art, the apparatus adapted to measure an angular deviation from a specified angle between first and second surface of a workpiece comprises a handle having a face on one surface for contacting the first surface of the workpiece and having a slot passing therethrough, an arm slidably received in the slot, means for locking the arm in a fixed position relative to the handle, a gauge mounted adjacent the end of the arm opposite the face of the handle, the gauge having a feeler point for contacting the second surface of the workpiece, and a contact member positioned along the arm so as to be offset from the face of the handle, the contact member contacting the second surface of the workpiece. To aid in the determination of angular deviation, a scale is provided on the face of the arm. The zero point of the scale is aligned with the longitudinal axis of the feeler point thereby providing a measure of distance from the feeler point to the face of the handle. In the preferred embodiment, the contact point is a member slidable along the arm, the contact point member having means for being locked into position. In a second embodiment, the contact point is an extension to the handle, extending from the side of the handle containing the face for contacting a first surface of the workpiece.

BRIEF DESCRIPTION OF THE DRAWINGS

The invention will now be described with reference to the accompanying drawings in which:

FIG. 5 is a side elevation of a second embodiment of the angle gauge; and

FIG. 6 is an end view of the invention shown in FIGS. 1 and 5.

DESCRIPTION OF THE PREFERRED EMBODIMENTS

Figure 1:
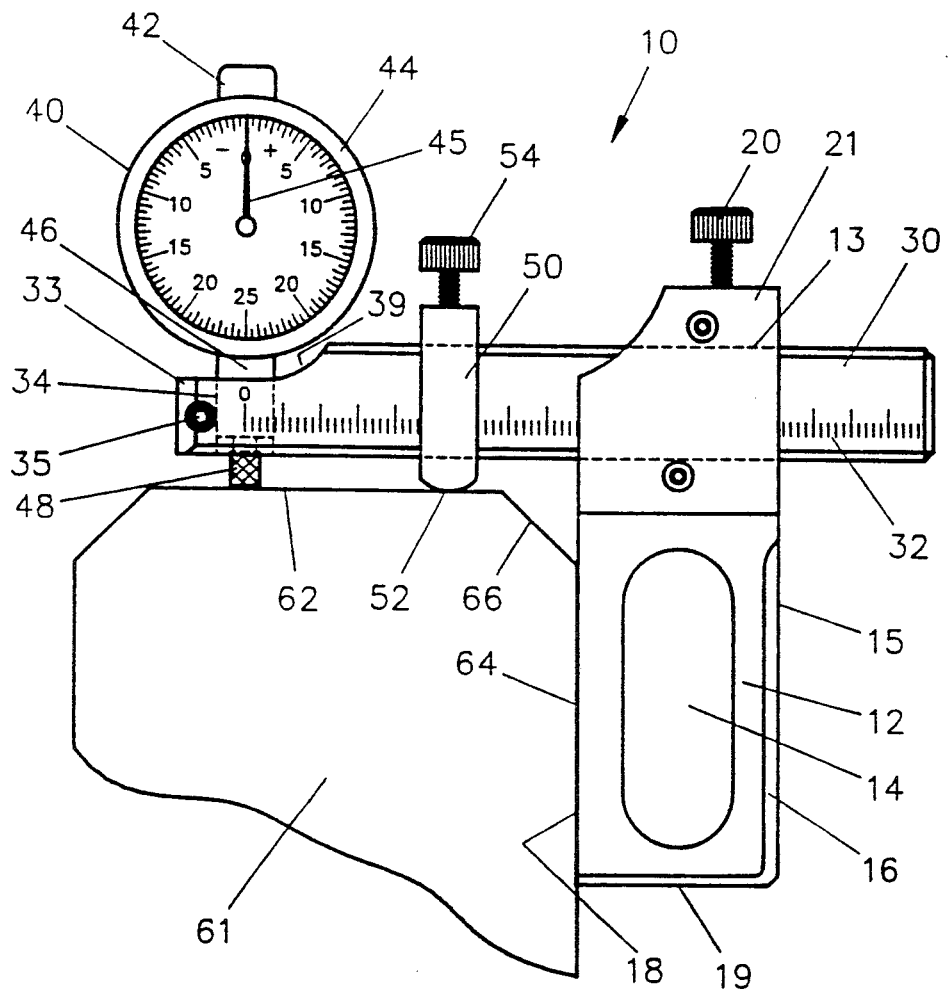
FIG. 1 is a side elevation of a first embodiment of the angle gauge of this invention.

The preferred embodiment of the angle gauge 10 shown in FIG. 1 includes a handle 12, an arm 30 slidably received in opening 13 of handle 12, a contact member 50 slidably mounted on arm 30 and a gauge 40 fixedly mounted to an end of arm 30.

Handle 12, made of a metal or other hard and damage resistance substance, is of a boxlike configuration having a length, width and depth ratio of preferably approximately 5:1.5:1. The edges 16 between back surface 15 and the side surfaces, as well as between bottom surface 19 and the side surfaces can be shaped by rounding or chamferring for comfort in handling. Front face 18 is smooth and provides the contact surface for contact with a first surface 64 of workpiece 61. An opening 14 is provided in the lower segment of handle 12 to reduce the weight of the apparatus and to facilitate handling. Opening 14 is parallel to front surface 18 and back surface 15. At an upper end of handle 12 is an arm opening 13. Arm opening 13 passes from face surface 18 to back surface 15 and preferably has a square or rectangular cross-section. The longitudinal axis of arm opening 13 is perpendicular to face 18.

Arm 30, having a cross-section of the same shape as but slightly smaller than arm opening 13, is slidably received in arm opening 13. Mounted in an opening (not shown) in surface 21 of handle 12 is retention means 20. Retention means 20 is preferably a thumb screw received in a threaded opening and of such a length as to be capable of engaging arm 30 passing through arm opening 13 to fix arm 30 in position. Arm 30 preferably has a distance scale 32, either English or metric, on at least one surface.

Figures 2A, 2B:
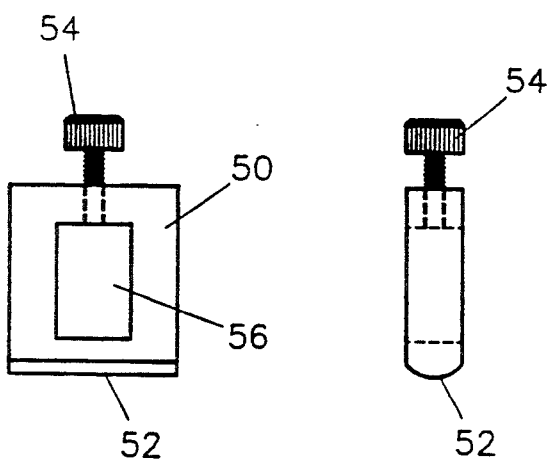
FIG. 2a is a front view of a slidable contact member.
FIG. 2b is a side view of the slidable contact member.

Slidably mounted on arm 30 by means of opening 56 is contact member 50. The lower surface of contact member 50, extending below arm 30, defines contact point 52. Contact member 50 is fixed in position on arm 30 by means of thumb screw 54 or other retention means known to one skilled in the art. Although contact member 50, as shown in FIG. 2, completely surrounds arm 30, other configurations are possible so long as they allow contact member 50 to be securely fixed in position on arm 30 and ensure contact point 52 lies in a plane passing through the longitudinal axis of arm 30 and the longitudinal axis of thumb screw 54.

Adjacent an end of arm 30, opposite that passing through handle 12, is gauge stem opening 34. Gauge stem opening 34 extends parallel to handle 12 to receive stem 46 of deviation gauge 40. Upper surface 33 of arm stem 30 is configured to have an arc like surface 39 corresponding to the outer circumference of deviation gauge 40.

Extending from stem 46, below arm 30 is feeler point 48 which also defines a 0 point on scale 32. Feeler point 48 is movable along a line defining the longitudinal axis of stem 46 and is mechanically or electrically connected to a readout on the face of gauge 40. Feeler point 48 contacts second surface 62 of workpiece 61 at a point further removed from face 18 of handle 12 than does contact point 52 of contact member 50. Gauge 40, which may be electronic or mechanical, has means for being calibrated. The calibration means can be an adjustment mechanism 42 for bringing needle 45 into alignment with a zero point or other predetermined point of a scale on the gauge face or for placing a zero or other indication on an electric readout when the gauge is positioned on a calibration workpiece having a precise 90° corner. Alternatively, the calibration means can be a rotatable bezel ring 44 having a scale thereon which may be rotated to align the zero point and needle during calibration.

Figure 3:
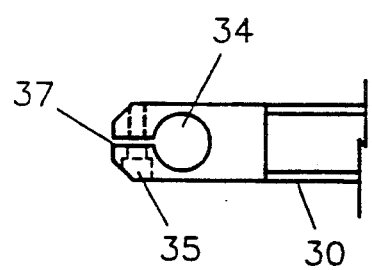
FIG. 3 is a top view of the end of the arm of the angle gauge.
Figure 4:
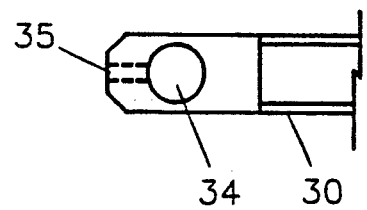
FIG. 4 is a top view of a second embodiment of the end of the arm of the angle gauge.

Gauge stem 46 is retained in gauge stem opening 34 by means of set screw 35 (FIGS. 3-4). Set screw 35 may extend laterally across the width of arm 30 such that with slot 37, between gauge stem opening 34 and the end of arm 30, it is capable of reducing the circumference of gauge stem opening 34 thereby tightly clamping gauge stem 46 in arm 30. Alternatively, set screw 35 may be introduced from the end of arm 30 and upon tightening fixedly engage gauge stem 46. The distance between the longitudinal axis of feeler point 48 and front surface 18 of handle 12 may be determined from scale 32.

FIG. 5 shows a second embodiment of the invention. The embodiment in FIG. 5 differs from the preferred embodiment by the inclusion of the contact member in handle 12. Contact member 29 is an extension of handle 12 in the direction toward deviation gauge 40. Extension 29 has a front face 27 which parallels face 18 of handle 12. The lower surface of extension 29 appears, in profile, like a sign wave curve consisting of recess 26 and a contact portion 28. Contact portion 28 contains contact point 52.

Measurement opening 22 is provided in handle 12 to permit determination of the distance between feeler point 48 and face 18. Immediately below measurement opening 22, and aligned with face 18, is alignment mark 24 for designating the scale 32 graduation on arm 30 for reading as a distance measurement. Alternatively, the distance between feeler point 48 and face 27 could be read from scale 32 and a known distance between face 27 and face 18 added thereto for the total distance deviation gauge 40 is displaced from workpiece surface 64.

In use, the apparatus is calibrated as discussed above in the discussion of adjustment mechanism 42 and bezel ring 44. Following calibration, front surface 18 of handle 12 is placed against first surface 64 of the workpiece. Thumb screw 20 is loosened and arm 30 positioned so as to place feeler point 48 of gauge 40 at the point to be checked. Thumb screw 20 is tightened locking arm 30 securely in position with respect to handle 12. Thumb screw 54 of contact member 50, in the preferred embodiment, is loosened and contact member 50 moved along arm 30 to a position close to but away from face 18 of handle 12 to avoid chamfers, holes or other surface discontinuities in workpiece 61 such as corner 66 shown in FIG. 1. Contact point 52 is positioned on a point lying in the plane defining the upper, or second, surface 62 of workpiece 61. So placed, the deviation registered, from the zero point, by deviation gauge 40 provides a measurement of an opposite side of a right angle triangle. The distance from feeler point 48 to surface 18, which is parallel to and is virtually collocated with first surface 64 of workpiece 61, can be read from scale 30 to provide a measurement of an adjacent side of a right angle triangle. The angular deviation from square can be determined by the expression:

$$\operatorname{Tan}\alpha = \frac{\text{opposite side}}{\text{adjacent side}}$$

where $\alpha$ is the angle of deviation.

The second embodiment is used in exactly the same manner as the first embodiment. However, fixed contact member 29 limits the use of embodiment 2 with workpieces having chamfered corners, holes, slots or other perturbations on the second surface 62 closely adjacent first surface 64.

Although certain preferred embodiments have been shown and described, it should be understood that many changes and modifications may be made therein without departing from the spirit and scope of the invention.

What I claim is:

1. An angle measuring apparatus adapted to measure an angular deviation from a specified angle between first and second surfaces of a workpiece, comprising:

a handle having a face on one surface for contacting the first surface of the workpiece and an opening passing through said handle;

an arm slidably received in said opening;

means for locking said arm in a fixed position relative to said handle;

an angle deviation means for determining, in conjunction with said handle, the angular deviation of the second surface from the specified angle between said first and second surfaces of the workpiece, said angle deviation means comprising a guage fixedly mounted to said arm adjacent to an end of said arm opposite the face of said handle and having a feeler point for contacting the second surface of the workpiece, and a contact member slidably mounted on said arm between said gauge and said handle, said contact member contacting the second surface of the workpiece.

2. An angle measuring apparatus as claimed in claim 1 wherein said face of said handle and said contact member provide means for positioning the workpiece for measurement of the angular deviation between the first and second surfaces by said gauge.

3. An angle measuring apparatus as claimed in claim 2, further comprising means for measuring a distance from said feeler point of said gauge to a point where the first surface of the workpiece contacts said face of said handle.

4. An angle measuring apparatus as claimed in claim 3, wherein said means for measuring a distance comprises:

a scale on a surface of said arm, a zero point of said scale aligned with the longitudinal axis of said feeler point; and means for identifying a point on the scale aligned with said face of said handle.

5. An angle measuring apparatus as claimed in claim 1, wherein said gauge further comprises means for calibrating said gauge.

6. An angle measuring apparatus as claimed in claim 1, further comprising a distance scale on said arm.

7. An angle measuring apparatus as claimed in claim 6, wherein a zero point of said scale is aligned with a point where said feeler point contacts the second surface of the workpiece.

8. An angle measuring apparatus as claimed in claim 1, further comprising means for fixedly mounting said gauge.

9. An angle measuring apparatus as claimed in claim 1, further comprising fixation means for fixing said contact member in position on said arm such that said contact member and said face of said handle position the workpiece for measurement of the angular deviation between the first and second surfaces.

10. An angle measuring apparatus as claimed in claim 1, further comprising a scale on said arm, a zero point of said scale aligned with said feeler point at a point where said feeler point contacts the second surface of the workpiece.

11. An angle measuring apparatus as claimed in claim 1, wherein said arm is substantially perpendicular to said handle.

12. An angle measuring apparatus adapted to measure an angular deviation from a specified angle between first and second surfaces of a workpiece, comprising:

a handle having a face on one surface for contacting the first surface of the workpiece and an opening passing through said handle;

an arm slidably received in said opening;

means for locking said arm in a fixed position relative to said handle;

a gauge means for determining the angular deviation of the second surface from the specified angle, said gauge means fixedly mounted to said arm adjacent to an end of said arm opposite the face of said handle and having a feeler point for contacting the second surface of the workpiece; and a contact member slidably located on said arm between said gauge and said handle for contacting the second surface of the workpiece, said contact member including fixation means for fixing said contact member in a predetermined position on said slidable arm, said face of said handle and said contact member seating the workpiece therebetween for determining the angular deviation from the specified angle between the first and second surfaces by said gauge means.

13. An angle measuring apparatus as claimed in claim 12, said arm further comprising a scale for measuring a distance from the contact point of said gauge to a point where the first surface of the workpiece contacts said face of said handle.

* * * * *